United States Patent
Oda et al.

(10) Patent No.: US 6,962,085 B2
(45) Date of Patent: Nov. 8, 2005

(54) PRESSURE DETECTOR HAVING ELONGATE HOUSING CONTAINING PRESSURE-SENSITIVE ELEMENT THEREIN

(75) Inventors: Teruo Oda, Gamagori (JP); Inao Toyoda, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/778,135

(22) Filed: Feb. 17, 2004

(65) Prior Publication Data

US 2004/0159159 A1 Aug. 19, 2004

(30) Foreign Application Priority Data

Feb. 17, 2003 (JP) ......................................... 2003-038231
Feb. 17, 2003 (JP) ......................................... 2003-038232

(51) Int. Cl.$^7$ ................................................. G01L 9/06
(52) U.S. Cl. ........................................................ 73/727
(58) Field of Search ........................... 73/720, 721, 726, 73/727, 706, 714, 756

(56) References Cited

U.S. PATENT DOCUMENTS 4,269,070 A * 5/1981 Nelson et al. ................. 73/779
4,589,528 A * 5/1986 Axthammer et al. ...... 188/266.2
5,168,192 A   12/1992 Kosugi et al.
5,583,295 A   12/1996 Nagase et al.
6,443,005 B1 * 9/2002 Chandler, Jr. ................. 73/301

FOREIGN PATENT DOCUMENTS

| JP | A-9-43075  | 2/1997 |
| JP | A-10-62284 | 3/1998 |
| JP | A-11-68120 | 3/1999 |

* cited by examiner

*Primary Examiner*—William Oen
(74) *Attorney, Agent, or Firm*—Posz Law Group, PLC

(57) ABSTRACT

A pressure detector such as a combustion pressure sensor includes a pressure-sensitive element disposed in a cylindrical housing. Electrical signals responsive to pressure applied to the pressure-responsive element are generated in the element and led to output terminals through conductor patterns formed on the surface of a connecting member disposed between the pressure-responsive element and the output terminals. The conductor patterns may be formed in grooves formed on the surface of the connecting member. In place of the connecting member, a disc-shaped thin conductive member made of an anisotropiccally conductive material may be used.

9 Claims, 3 Drawing Sheets

PRESSURE DETECTOR HAVING ELONGATE HOUSING CONTAINING PRESSURE-SENSITIVE ELEMENT THEREIN

CROSS-REFERENCE TO RELATED APPLICATIONS

This application is based upon and claims benefit of priority of Japanese Patent Applications No. 2003-38231 filed on Feb. 17, 2003 and No. 2003-38232 filed on Feb. 17, 2003, the contents of which are incorporated herein by reference.

BACKGROUND OF THE INVENTION

1. Field of the Invention

The present invention relates to a pressure detector for detecting a pressure in a space such as a combustion chamber of an internal combustion engine.

2. Description of Related Art

An example of a pressure detector of this kind is disclosed in JP-A-7-253374. The pressure detector disclosed therein includes a housing to be installed in a combustion chamber of the engine, a pressure-sensitive element contained in the housing, a pressure-transmitting member for transmitting pressure imposed on the housing to the pressure-sensitive member, and an output connector for taking out electrical signals of the pressure-sensitive element.

In this pressure detector, a connecting member for electrically connecting the pressure-sensitive element to the output connector is used. As this connecting member, a terminal assembly that includes plural terminals held by hermetic members is used. One end of the terminals in the connecting member is connected to a connector pin of the output connector by welding, and the other end is connected to the pressure-sensitive element by wire bonding.

When this type of the pressure detector is used as a combustion pressure sensor, a portion of the housing on which the combustion pressure is imposed is inserted into a hole formed in the engine block. In order to save a space for installing the pressure detector to the engine, it is required to minimize a diameter of the housing. In the conventional pressure detector, however, the diameter of the housing is determined by the size of the terminal assembly, because the terminal assembly is the largest component among components to be contained in the housing.

Further, the diameter of the housing has to be set to cover all dimensional fluctuations of the terminal assembly. It is difficult to reduce the dimensional fluctuations in the terminal assembly because the dimensional fluctuations are composed of plural fluctuations such as those in the size of the terminal itself, a space between terminals and the size of the hermetic members. Therefore, the diameter of the housing is set to such a size that allows the largest dimensional fluctuations in the terminal assembly. Therefore, it has been difficult to reduce the diameter of the housing.

SUMMARY OF THE INVENTION

The present invention has been made in view of the above-mentioned problem, and an object of the present invention is to provide an improved pressure detector in which the diameter of the housing is reduced.

The pressure detector is mainly composed of a cylindrical housing, a diaphragm disposed at one end of the housing, a pressure-sensitive element disposed in the housing, a pressure-transmitting member positioned between the diaphragm and the pressure-sensitive element, output terminals disposed at the other end of the housing, and a connecting member disposed between the pressure-sensitive element and the output terminals. Pressure received by the diaphragm is transmitted to the pressure-sensitive element via the pressure-transmitting member. Electrical signals responsive to the pressure applied to the pressure-sensitive element are generated therein. The signals of the pressure-sensitive element are led to the output terminals through the connecting member.

Electrical conductors connecting both longitudinal ends of the connecting member are formed on the surface of the connecting member. The pressure-sensitive element is electrically connected to the electrical conductors by bonding wires, while the output terminals contact the electrical conductors. Thus, the signals of the pressure-sensitive element are led to the output terminals through the connecting member.

The connecting member may be made in a cylindrical pillar shape and disposed in the housing formed in a cylindrical shape. Grooves may be formed on the cylindrical surface of the connecting member along its longitudinal axis, and the electrical conductors may be formed as conductor patterns in the grooves. A semi-spherical member may be connected to the pressure-sensitive element so that the semi-spherical member contacts the pressure-transmitting member. The connecting member may be replaced with a conductive member in a thin disc shape. The conductive member is positioned between electrodes formed on a surface of the pressure-sensitive element and the output terminals.

According to the present invention, the diameter of the housing can be made smaller than the conventional one since the diameter of the housing is determined solely by the size of the connecting member, without worrying about dimensions and size fluctuations of other components forming the conventional terminal assembly. By using the disc-shaped conductive member having a size not exceeding the size of the pressure-sensitive element, the diameter of the housing can be made further smaller. Other objects and features of the present invention will become more readily apparent from a better understanding of the preferred embodiments described below with reference to the following drawings.

DETAILED DESCRIPTION OF THE PREFERRED EMBODIMENTS

Figure 1:
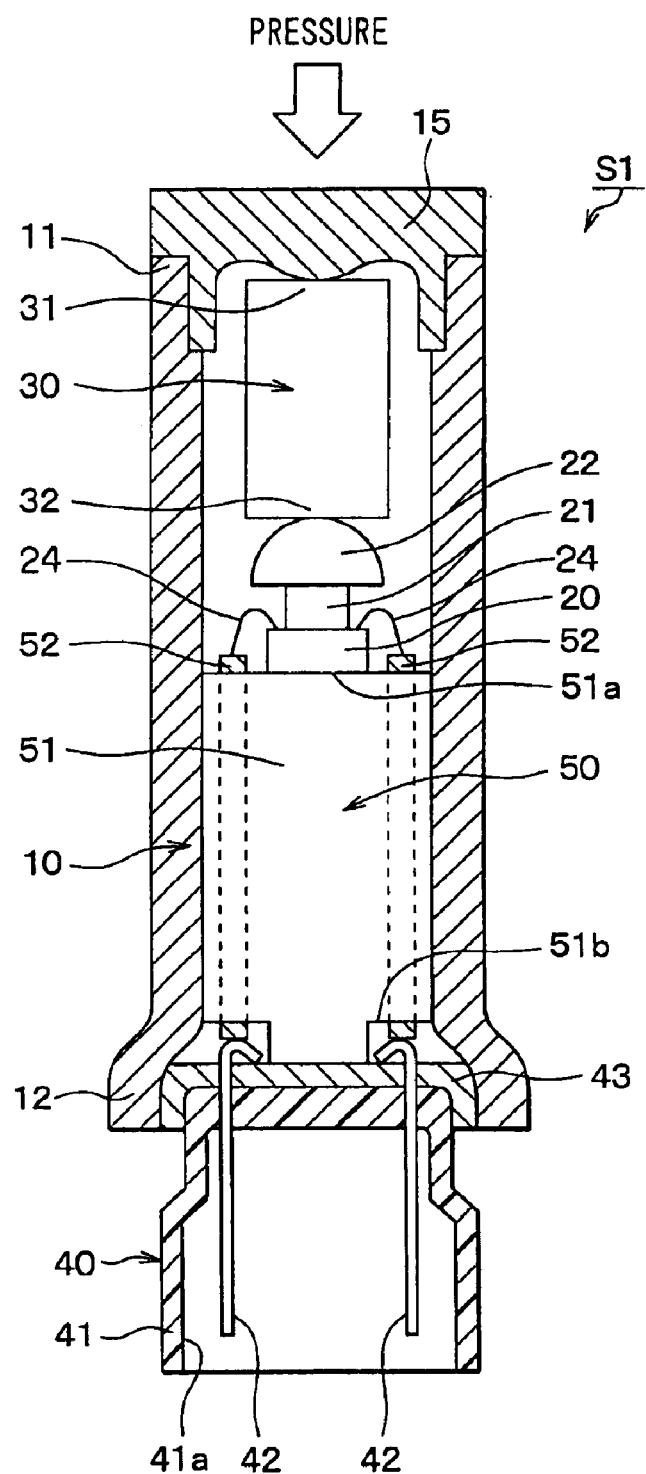
FIG. 1 is a cross-sectional view showing a pressure detector as a first embodiment of the present invention.

A first embodiment of the present invention will be described with reference to FIGS. 1 and 2. A pressure detector S1 may be used as a detector for detecting pressure in a combustion chamber of an internal combustion engine. As shown in FIG. 1, the pressure detector S1 is mainly composed of: an elongate housing 10 that is installed to an engine; a pressure-sensitive element 20 disposed in the housing 10; a pressure-transmitting member 30 formed in a rod shape and disposed between the pressure sensitive element 20 and a diaphragm 15 closing one end 11 of the housing 10; a connector 40 disposed at the other end 12 of the housing 10; and a connecting member 50 disposed between the pressure-sensitive element 20 and the connector 40 for electrically connecting both.

The housing 10 is made of a metallic material such as stainless steel and is formed in an elongate cylindrical shape. A diaphragm 15 to be strained by a pressure imposed thereon is disposed to close one end 11 of the housing 10. The diaphragm 15 is connected to the end 11 of the housing 10 by welding or the like. When the pressure detector S1 is used as a combustion pressure sensor, the housing 10 is inserted into a hole formed in a cylinder block so that an outer surface of the diaphragm 15 is exposed to the combustion chamber. In this case, a thread is formed around the cylindrical housing 10, and the housing 10 is connected to the engine block by the thread.

The pressure-transmitting member 30 in a rod shape is disposed in the housing 10 so that one end 31 thereof contacts the diaphragm 15. The pressure-transmitting member 30 is made of a metallic material such as stainless steel. The pressure to be measured is imposed on the outer surface of the diaphragm 15 as shown with an arrow in FIG. 1. The pressure-sensitive element 20, to which a semi-spherical member 22 is connected via a connecting rod 21, is disposed in the housing 10 so that the semi-spherical member 22 contacts the other surface 32 of the pressure-transmitting member 30. As the pressure-sensitive element 20, various types of the pressure sensor can be used. For example, a sensor constituted by forming gauge resistors on a semiconductor substrate may be used. More particularly, the gauge resistors may be made by a diffusion method, and those gauge resistors may be connected to form a bridge circuit.

The connecting rod 21 is made of glass and is connected to the pressure-responsive element 20 by an anode-connection method or the like. The semi-spherical member 22 made of a metallic material such as carbon steel is connected to the connecting rod 21 with adhesive, for example. Thus, the pressure-sensitive member 20, the connecting rod 21 and the semi-spherical member 22 are integrally connected. The pressure imposed on the diaphragm 15 is transmitted to the semi-spherical member 22 through the pressure-transmitting member 30. The pressure transmitted to the spherical member 22 is transmitted to the pressure-sensitive element 20 via the connecting rod 21.

Figure 2:
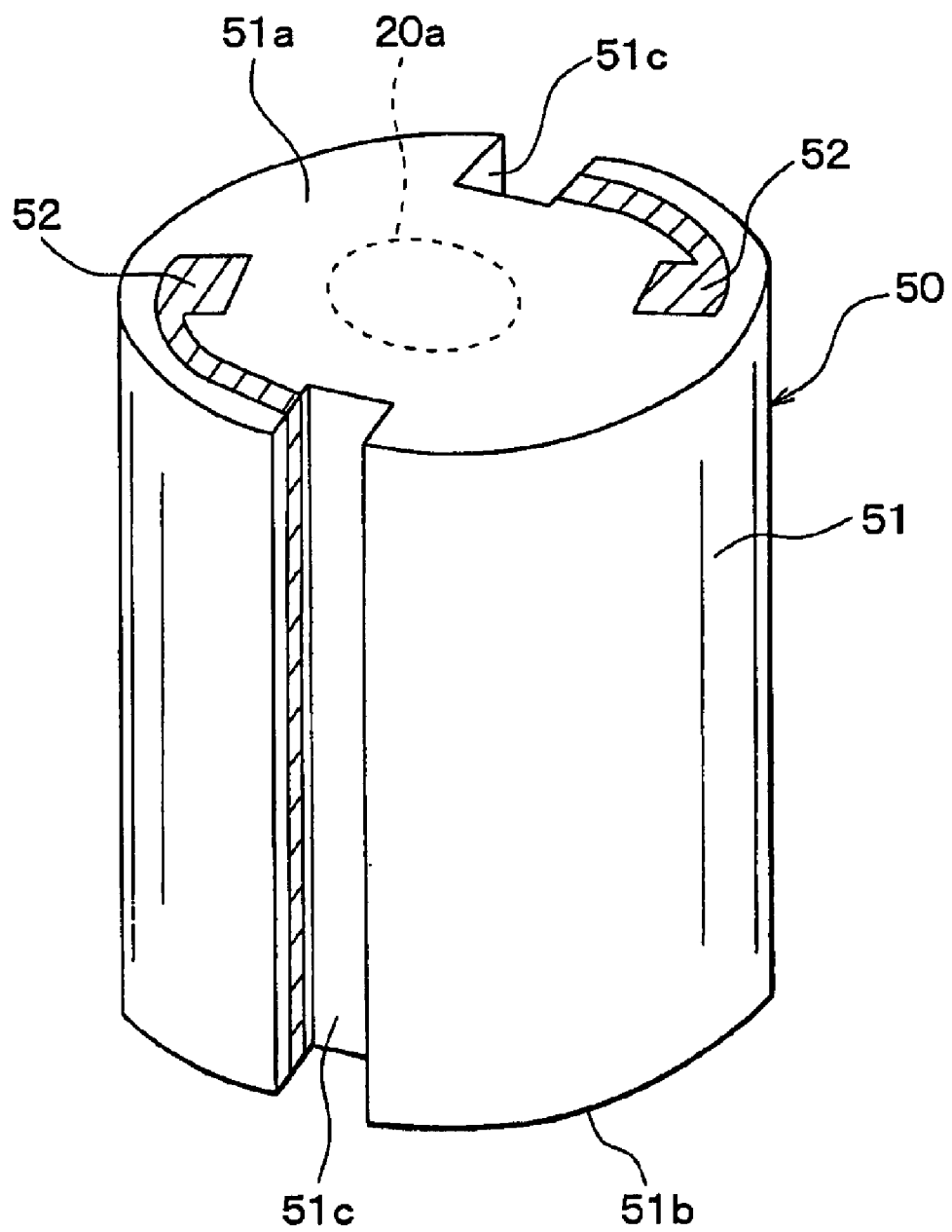
FIG. 2 is a perspective view showing a connecting member for electrically connecting a pressure-sensitive element to output terminals.

As shown in FIG. 2, the connecting member 50 is formed in a shape of a three-dimensional cylindrical pillar. The connecting member 50 is composed of a cylindrical pillar 51 and conductor patterns 52 formed on the surface of the cylindrical pillar 51 as shown in FIG. 2. The cylindrical pillar 51 is made of hard resin such as liquid crystal polymer (LCP), and the conductor pattern 52 is made of a metallic film such as a copper or gold film. Grooves 51c are formed on the outer cylindrical surface of the cylindrical pillar 51 from a first longitudinal end 51a to a second longitudinal end 51b. The conductor patterns 52 may be made by plating copper or gold on the surface of the cylindrical pillar 51 after covering the portions not forming the conductor patterns 52 with a resist.

The pressure-sensitive element 20 is mounted on an area 20a encircled with a dotted line in FIG. 2 and connected to that area 20 with adhesive. As shown in FIG. 1, the pressure-sensitive element 20 is electrically connected to the conductor patterns 52 by bonding wires 24 made of gold, aluminum or the like. Thus, the output signals of the pressure-sensitive element 20 are led from the first longitudinal end 51a to the second longitudinal end 51b of the cylindrical pillar 51. In place of the grooves 51c, through-holes may be made in the cylindrical pillar, and the conductor patterns 52 may be formed in the through-holes.

As shown in FIG. 1, a portion of the second longitudinal end 51b of the cylindrical pillar 51 is projected and contacts the connector 40. The connector 40 is composed of a connector housing 41 having a closed end and an open end 41a, a connector plate 43 closing the other end 12 of the housing 10, and output terminals 42. The connector housing 41 is made of a resin material such as polyphenylene sulfide (PPS). The output terminals 42 and the connector plate 43 are integrally connected to the connector housing 41 by insert-molding. The terminals 42 is made of copper or the like, and the connector plate 43 is made of a metallic material such as stainless steel. The connector plate 43 is connected to the open end 12 of the housing 10 by welding or staking.

The projected portion of the second longitudinal end 51b of the cylindrical pillar 51 contacts the connector plate 43, and thereby the pressure transmitted from the diaphragm 15 to the connecting member 50 is received by the connector plate 43. One end of the output terminals 42 extends through the connector plate 43 into the inside space of the housing 10 and contacts the conductor pattern 52. The electrically connection between the conductor patterns 52 and the output terminals 42 is securely made by utilizing a spring action of the output terminals 42. The other end of the output terminals extends toward the open end 41a of the connector housing 41. The signals of the pressure-sensitive element 20 are led out by connecting the output terminals to an outside device.

The pressure detector S1 is assembled in the following manner. The pressure-responsive element 20, to which the semi-spherical member 22 is integrally connected via the connecting rod 21, is mounted on the first longitudinal end 51a of the cylindrical pillar 51. Then, the pressure-responsive element 20 is electrically connected to the conductor patterns 52 through the bonding wires 24. After the pressure-transmitting member 30 is inserted into the housing 10, the connecting member 50 carrying the pressure-responsive element 20 thereon is inserted into the housing 10. Then, the connector plate 43 is welded or staked to the open end 12 of the housing 10 while pushing the connector plate 43 toward the connecting member 50. Thus, the pressure-detector S1 is completed.

When the pressure-detector S1 is used as a combustion pressure sensor, the housing 10 is inserted into a hole formed in an engine block so that the diaphragm 15 is positioned in a combustion chamber and the pressure therein is imposed on the diaphragm 15. The pressure imposed on the diaphragm 15 is transmitted to the pressure-sensitive element 20 through the pressure-transmitting member 30. The pressure-responsive element 20 generates output signals responsive to the pressure transmitted thereto. The output signals are taken out from the output terminals 42 through the bonding wires 24 and the conductor patterns 52 formed on the cylindrical pillar 51.

In the first embodiment described above, the output signals of the pressure-sensitive element 20 are led to the output terminals 42 through the connecting member 50 having a cylindrical shape and disposed in the housing 10. Since the inner diameter of the housing 10 is determined by the outer diameter of the connecting member 50, only the size deviation or fluctuation of the connecting member has to be considered in determining the inner diameter of the housing 10. In other words, it is not necessary to consider size deviations or fluctuations of other components, which was necessary in the conventional detector in which the terminal assembly is used. Thus, the housing size can be made smaller according to the present invention.

Figure 3:
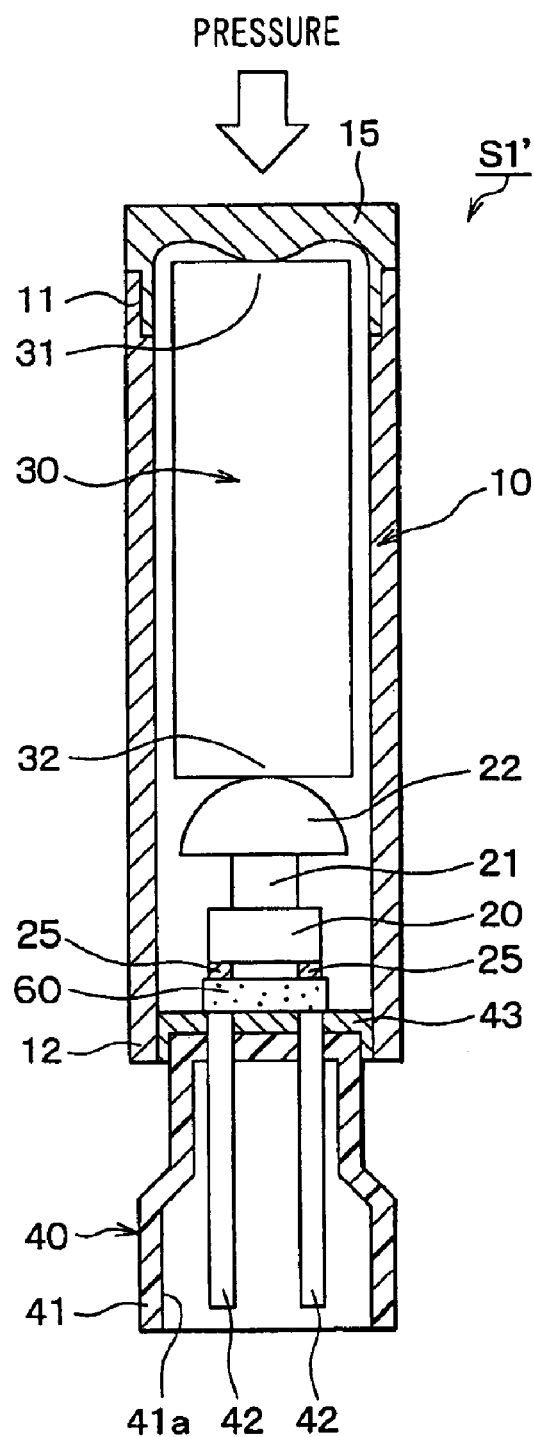
FIG. 3 is a cross-sectional view showing a pressure detector as a second embodiment of the present invention.

A second embodiment of the present invention will be described with reference to FIG. 3. In this embodiment, the connecting member 50 used in the first embodiment is replaced with a conductive member 60. Electrodes 25 for leading out the output signals generated in the pressure-responsive element 20 are formed on the bottom surface of the pressure-sensitive element 20 by sputtering or vapor-deposition. The conductive member 60 is positioned between the electrodes 25 and the output terminals 42. Thus, the pressure-responsive element 20 and the output terminals 42 are electrically connected.

The conductive member 60 is an anisotropically conductive film, which is made by aligning conductive powder such as silver powder only along in the thickness direction of the film, so that the film is conductive only in its thickness direction. Alternatively, the conductive member 60 may be made of anisotropically conductive adhesive or conductive adhesive such as silver paste. If the conductive member 60 is made of such conductive adhesive, it is necessary to separate the conductive member 60 into two portions to avoid short-circuiting between two terminals 42.

In the second embodiment, it is not necessary to form bonding wires outside of the pressure-sensitive element 20. The electrodes 25 contacting the conductive member 60 are formed within the size of the pressure-sensitive element 20, i.e., within the outer peripheral size of the pressure-sensitive element 20 in the plane perpendicular to the axial direction of the housing 10, and the output terminals 42 are positioned within the size of the pressure-sensitive element 20. Therefore, the cylindrical housing 10 can be made further smaller.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A pressure detector comprising:

an elongate hosing having a diaphragm adapted to de strained in response to pressure applied thereto, the diaphragm being disposed at one end of the elongate housing;

a pressure-sensitive element disposed in the elongate housing, the pressure-sensitive element outputting signals in response to the pressure applied thereto;

a pressure-transmitting member disposed between the diaphragm and the pressure-responsive element, so that pressure is applied to the pressure-sensitive element according to the strain of the diaphragm;

output terminals for outputting the signals of the pressure-sensitive element, the output terminals being disposed at the other end of the elongate housing; and a connecting member for electrically connecting the pressure-sensitive element to the output terminals, the connecting member being disposed between the pressure-sensitive element and the output terminals, wherein:

the connecting member is formed in a three-dimensional pillar shape, and electrical conductors extending between both longitudinal ends of the pillar-shaped connecting member are formed on a surface of the connecting member.

2. The pressure detector as in claim 1, wherein:

the elongate housing is formed in a cylindrical shape; and the connecting member is formed in a cylindrical pillar shape and disposed in the cylindrical housing to fit an inner bore of the cylindrical housing.

3. The pressure detector as in claim 2, wherein:

the electrical conductors are conductor patterns formed on the surface of the connecting member.

4. The pressure detector as in claim 3, wherein:

grooves are formed on a cylindrical surface of the connecting member along its axial direction; and the conductor patterns are formed in the grooves.

5. The pressure detector as in claim 1, wherein:

a semi-spherical member contacting the pressure-transmitting member is connected to the pressure-sensitive element.

6. A pressure detector comprising:

an elongate housing having a diaphragm adapted to be strained in response to pressure applied thereto, the diaphragm being disposed at one end of the elongate housing;

a pressure-sensitive element disposed in the elongate housing, the pressure-sensitive element outputting signals in response to the pressure applied thereto;

a pressure-transmitting member disposed between the diaphragm and the pressure-responsive element, so that pressure is applied to the pressure-sensitive element according to the strain of the diaphragm;

output terminals for outputting the signals of the pressure-sensitive element, the output terminals being disposed at the other end of the elongate housing; and a conductive member for electrically connecting the pressure-sensitive element to the output terminals, the conductive member being disposed between the pressure-sensitive element and the output terminals, wherein:

electrodes for leading out the signals of the pressure-sensitive element are formed on a surface of the pressure-sensitive element, the electrode being in contact with the conductive member.

7. The pressure detector as in claim 6, wherein:

the elongate housing is formed in a cylindrical shape; and a surface area of the conductive member in a plane perpendicular to an axial direction of the cylindrical housing is substantially equal to or less than that of the pressure-sensitive element.

8. The pressure detector as in claim 7, wherein:

the conductive member is made of an anisotropically conductive material so that the conductive member is conductive only in the axial direction of the cylindrical housing.

9. The pressure detector as in claim 6, wherein:

a semi-spherical member contacting the pressure-transmitting member is connected to the pressure-sensitive element.

* * * * *